US009654811B2

(12) United States Patent
Brooks (10) Patent No.: US 9,654,811 B2
(45) Date of Patent: *May 16, 2017

(54) TECHNIQUE FOR EFFECTIVELY PROVIDING PROGRAM MATERIAL IN A CABLE TELEVISION SYSTEM

(71) Applicant: Time Warner Cable Enterprises LLC, New York, NY (US)

(72) Inventor: Paul D. Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,918

(22) Filed: Apr. 28, 2014

(65) Prior Publication Data

US 2014/0325582 A1  Oct. 30, 2014

Related U.S. Application Data

(62) Division of application No. 09/956,688, filed on Sep. 20, 2001, now Pat. No. 8,713,623.

(51) Int. Cl.
*H04N 7/173* (2011.01)
*H04N 21/2385* (2011.01)
(Continued)

(52) U.S. Cl.
CPC ......... *H04N 21/2385* (2013.01); *H04N 7/106* (2013.01); *H04N 7/12* (2013.01);
(Continued)

(58) Field of Classification Search
CPC ............. H04N 21/266; H04N 21/6405; H04N 21/2385
(Continued)

(56) References Cited

U.S. PATENT DOCUMENTS 4,750,213 A  6/1988 Novak
5,606,359 A  2/1997 Youden et al.
(Continued)

FOREIGN PATENT DOCUMENTS

EP  0903941 A1  3/1999
EP  1030305 A2  8/2000
(Continued)

*Primary Examiner* — John Schnurr
(74) *Attorney, Agent, or Firm* — Gazdzinski & Associates, PC (57) ABSTRACT

In a cable television system in accordance with the invention, program materials are made available to subscribers in a neighborhood on an as needed basis. Specifically, when a subscriber at a set-top terminal selects a program channel to watch, the selection request is transmitted to a headend of the system. In response to such a request, a controller in the headend determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood.

29 Claims, 5 Drawing Sheets (51) Int. Cl.
*H04N 7/10* (2006.01)
*H04N 21/222* (2011.01)
*H04N 21/24* (2011.01)
*H04N 21/426* (2011.01)
*H04N 21/438* (2011.01)
*H04N 21/658* (2011.01)
*H04N 21/266* (2011.01)
*H04N 21/6405* (2011.01)
*H04N 7/12* (2006.01)
*H04N 7/16* (2011.01)
*H04N 11/02* (2006.01)
*H04N 11/04* (2006.01)

(52) U.S. Cl.
CPC ............... *H04N 7/16* (2013.01); *H04N 7/173* (2013.01); *H04N 7/17318* (2013.01); *H04N 11/02* (2013.01); *H04N 11/04* (2013.01); *H04N 21/2221* (2013.01); *H04N 21/2408* (2013.01); *H04N 21/266* (2013.01); *H04N 21/42684* (2013.01); *H04N 21/4383* (2013.01); *H04N 21/6405* (2013.01); *H04N 21/6581* (2013.01)

(58) Field of Classification Search
USPC .............................................. 725/93, 98, 120
See application file for complete search history.

(56) References Cited

U.S. PATENT DOCUMENTS

| | | | |
|---|---|---|---|
| 5,642,151 | A | 6/1997 | Nusbickel et al. |
| 5,708,961 | A | 1/1998 | Hylton et al. |
| 5,818,438 | A | 10/1998 | Howe et al. |
| 5,872,588 | A | 2/1999 | Aras et al. |
| 5,940,738 | A * | 8/1999 | Rao .................................. 725/103 |
| 5,983,318 | A | 11/1999 | Willson et al. |
| 6,072,982 | A * | 6/2000 | Haddad ............................ 725/93 |
| 6,198,478 | B1 * | 3/2001 | Ota et al. ....................... 715/716 |
| 6,510,556 | B1 | 1/2003 | Kusaba et al. |
| 6,543,053 | B1 | 4/2003 | Li et al. |
| 6,583,825 | B1 | 6/2003 | Kwoh et al. |
| 6,591,422 | B1 * | 7/2003 | Cesar ................. H04N 7/17318 348/E7.071 |
| 6,718,552 | B1 | 4/2004 | Goode |
| 6,754,271 | B1 | 6/2004 | Gordon et al. |
| 6,886,029 | B1 | 4/2005 | Pecus et al. |
| 6,889,382 | B1 | 5/2005 | Anderson |
| 7,003,790 | B1 | 2/2006 | Inoue et al. |
| 7,020,893 | B2 | 3/2006 | Connelly |
| 7,069,577 | B2 | 6/2006 | Gelle et al. |
| 7,228,555 | B2 | 6/2007 | Schlack |
| 7,272,227 | B1 | 9/2007 | Beran |
| 7,383,564 | B2 | 6/2008 | White et al. |
| 7,389,523 | B2 | 6/2008 | Kikinis |
| 7,827,227 | B2 | 11/2010 | Iijima et al. |
| 7,971,222 | B2 | 6/2011 | Ellis |
| 7,983,272 | B2 | 7/2011 | Carlson et al. |
| 2002/0002708 | A1 | 1/2002 | Arye |
| 2002/0056098 | A1 | 5/2002 | White |
| 2002/0056119 | A1 | 5/2002 | Moynihan |
| 2002/0059626 | A1 | 5/2002 | Lemmons |
| 2002/0069420 | A1 | 6/2002 | Russell et al. |
| 2002/0087967 | A1 | 7/2002 | Conkwright et al. |
| 2002/0092026 | A1 | 7/2002 | Janniello et al. |
| 2002/0138831 | A1 | 9/2002 | Wachtfogel et al. |
| 2002/0166121 | A1 | 11/2002 | Rovira |
| 2003/0028889 | A1 * | 2/2003 | McCoskey ......... H04N 7/17318 725/91 |
| 2003/0037331 | A1 | 2/2003 | Lee |
| 2003/0121047 | A1 | 6/2003 | Watson et al. |
| 2003/0156218 | A1 | 8/2003 | Laksono |
| 2003/0163817 | A1 | 8/2003 | Han |
| 2004/0123324 | A1 | 6/2004 | Sazzad et al. |
| 2004/0230994 | A1 | 11/2004 | Urdang et al. |
| 2005/0071882 | A1 | 3/2005 | Rodriguez et al. |
| 2006/0150216 | A1 | 7/2006 | Herz et al. |
| 2007/0083902 | A1 | 4/2007 | Urdang et al. |
| 2008/0216115 | A1 | 9/2008 | Kikinis |
| 2009/0187934 | A1 | 7/2009 | Norman |

FOREIGN PATENT DOCUMENTS

| | | |
|---|---|---|
| EP | 1030305 | 9/2002 |
| EP | 0903941 | 3/2004 |
| WO | WO9929108 | 6/1999 |

* cited by examiner

| X | $N_{PCHX}$ | ASSIGNED CARRIER |
|---|---|---|
| 1 | 0 | NULL |
| 2 | 12 | $C_3$ |
| 3 | 1 | $C_{11}$ |
| ⋮ | ⋮ | ⋮ |
| K | 5 | $C_{25}$ |

313 brackets row (1, 0, NULL); 311 brackets row (2, 12, $C_3$).

304 — X column; 306 — $N_{PCHX}$ column; 308 — ASSIGNED CARRIER column.

FIG. 5

402 STID  ···  404 $PCH_{NEW}$  406 $PCH_{OLD}$  ···

TECHNIQUE FOR EFFECTIVELY PROVIDING PROGRAM MATERIAL IN A CABLE TELEVISION SYSTEM

PRIORITY

This application is a divisional of and claims priority to co-owned U.S. patent application Ser. No. 09/956,688 of the same title filed Sep. 20, 2001, issuing as U.S. Pat. No. 8,713,623 on Apr. 29, 2014, which is incorporated herein by reference in its entirety.

FIELD OF THE INVENTION

The invention relates to a communications system and method, and more particularly to a community access television (CATV) system and method for providing program material through a network having limited bandwidth.

BACKGROUND OF THE INVENTION

Cable television is typically provided by delivering digital television programming through a community access television (CATV) system to subscribers. Specifically, in delivering the digital television programming, a headend in the CATV system distributes program data streams containing program materials through different channels of a distribution network, which occupy specified frequency bands. The program data stream for each channel is used to modulate a carrier associated with the channel. The resulting modulated carriers are combined and transmitted through the distribution network to a service area node, where the combined modulated carries are provided to a neighborhood. A subscriber in the neighborhood utilizes a set-top terminal to receive the combined modulated carriers and tune to a desired channel to obtain the program material from the associated modulated carrier.

In prior art, the combined modulated carriers provided to a neighborhood contain program materials of all channels used in a CATV system. However, as a cable TV provider uses an increasing number of channels to deliver additional program materials to attain a larger subscription, the number of available channels will soon run out. Thus, an urgent need arises where an efficient utilization of the limited bandwidth of the distribution network is required to deliver the additional program materials.

SUMMARY OF THE INVENTION

I have recognized that use of the distribution network bandwidth in a prior art CATV system is inefficient in that each program channel is fixedly assigned to one of the M carriers for transmission of its program material, where M represents the maximum number of carriers which the limited network bandwidth can accommodate. In addition, all of the program channels are simultaneously made available to each set-top terminal in a neighborhood. As a result, the number of program channels that a prior art CATV system can provide cannot exceed M.

The invention overcomes the prior art limitations by dynamically assigning carriers to carry program materials of only those program channels selected by the set-top terminals (or subscribers) in a neighborhood. Advantageously, the number of program channels that the inventive CATV system can provide, although not simultaneously, can exceed M. In accordance with the invention, a collection of program materials attributed to different program channels carried by assigned carriers are provided to a group of terminals on an as needed basis. When a terminal in the group issues a request for selected program material, a controller determines whether the selected program material has been included in the collection. If it is determined that the selected program material is not included in the collection, the controller causes the newly-selected program material to be added to the collection provided to the group of terminals. To that end, the controller assigns an unused carrier to carry the newly-selected material. A control message responsive to the request is then generated by the controller to the requesting terminal, which contains the identity of the assigned carrier. The requesting terminal may then tune to the identified carrier to obtain the requested program material.

In accordance with an aspect of the invention, any carrier which is assigned to carry program material no longer selected by any terminal in the group is retired and put in reserve for reassignment.

The present disclosure addresses the foregoing needs by providing, in various embodiments, methods and apparatus for effectively providing program material in a cable television system.

In a first aspect, an apparatus configured to provide a plurality of content elements to a group of terminals is disclosed. In one embodiment, the apparatus comprises: an interface configured to communicate to each of the terminals in the group and a processor in communication with the interface and configured to execute at least one computer program thereon, the computer program comprising a plurality of instructions. In one variant, the instructions are configured to, when executed: (i) assign a plurality of carriers to carry the plurality of content elements to each terminal in the group of terminals; (ii) process a request for a selected content element received from an individual one of the terminals in the group; and (iii) cause the interface to communicate to at least the individual one of the terminals in the group, information identifying at least one particular carrier from among the plurality of carriers which is assigned to carry the selected content element.

In a second aspect, a system is disclosed. In one embodiment, the system is configured to transmit a plurality of content streams comprising one or more content elements selected by individual ones of a group of terminals and comprises: (i) a control unit configured to associate one or more carriers with respective ones of the one or more content elements; (ii) a modulator unit; and (iii) a switching unit configured to route a plurality of data streams to the modulator unit, each of the plurality of data streams respectively representing individual ones of said one or more content elements selected by said individual ones of said group of terminals. The modulator unit is in one variant further configured to modulate the one or more carriers with the plurality of data streams representing the individual ones of the plurality of content elements associated therewith to generate the plurality of content streams.

In a third aspect, a method for providing one or more program materials to a group of terminals is disclosed. In one embodiment, the method comprises: (i) assigning a respective carrier to carry each of a plurality of programs to all of a plurality of terminal in a group; (ii) processing a request for selected program materials received from an individual one of the group of terminals; and (iii) communicating, to at least the individual one of the group of terminals, information identifying an individual one of the assigned carriers configured to carry the selected program materials.

In a fourth aspect, a method for transmission of a plurality of content streams comprising one or more content elements selected by individual ones of a group of terminals is disclosed. In one embodiment, the method comprises: (i) associating one or more carriers with respective ones of the one or more content elements; (ii) routing a plurality of data streams to a modulator unit, each of the plurality of data streams respectively representing individual ones of the one or more content elements; and (iii) causing the modulator unit to modulate the one or more carriers with the plurality of data streams representing the individual ones of the one or more content elements associated therewith to generate the plurality of content streams.

Other features and advantages of the present disclosure will immediately be recognized by persons of ordinary skill in the art with reference to the attached drawings and detailed description of exemplary embodiments as given below.

BRIEF DESCRIPTION OF THE DRAWING

Further objects, features and advantages of the invention will become apparent from the following detailed description taken in conjunction with the accompanying drawing, in which.

DETAILED DESCRIPTION

The invention is directed to a technique for utilizing limited network bandwidth to distribute program materials to subscribers in a community access television (CATV) system. In accordance with the invention, the CATV system makes available to subscribers selected program channels, as opposed to all of the program channels furnished by the system as in prior art. In the inventive CATV system, the program channels are provided on an as needed basis, and are selected to serve the subscribers in the same neighborhood requesting those channels.

Figure 1:
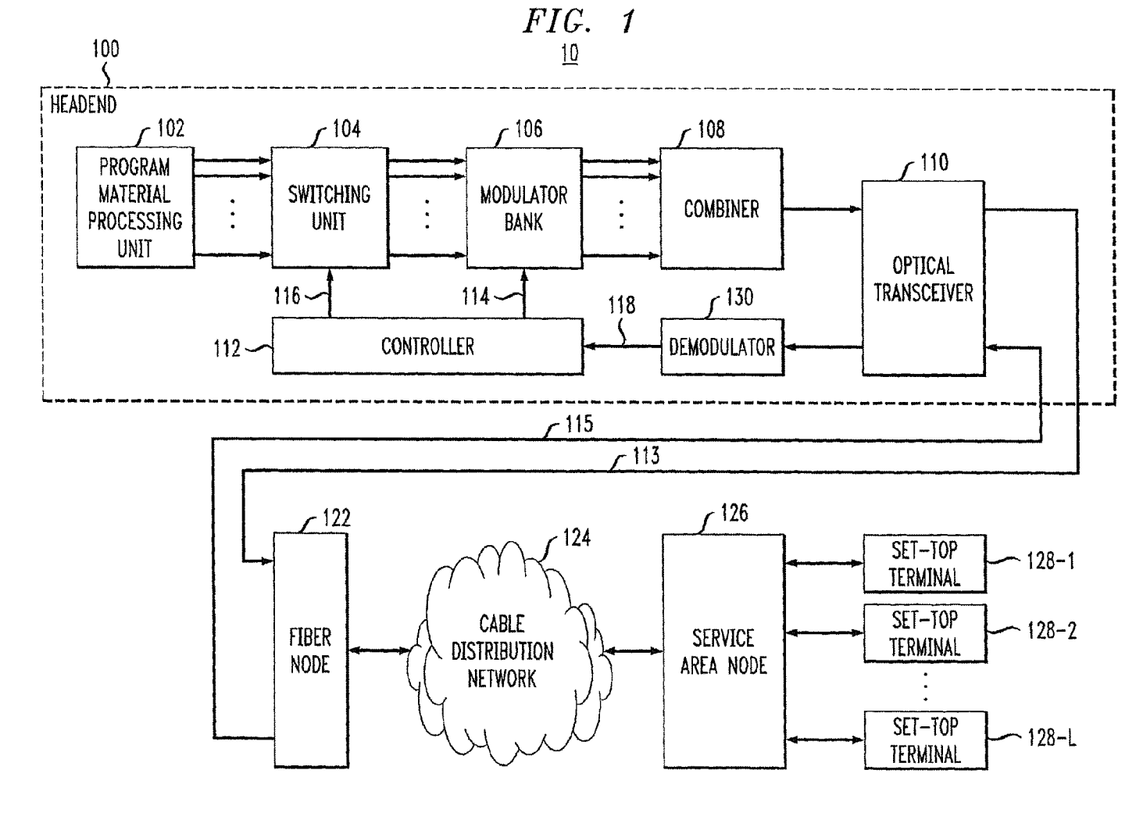
FIG. 1 is a block diagram of a hybrid fiber coax cable CATV system in accordance with the invention.

FIG. 1 illustrates hybrid fiber coax (HFC) cable CATV system 10 embodying the principles of the invention for providing program materials to set-top terminals on the subscriber premises. As shown in FIG. 1, system 10 includes headend 100, fiber node 122, cable distribution network 124, and service area node 126 which is connected to set-top terminals 128-1 through 128-L in a neighborhood, where L is a predetermined number.

In headend 100, program material processing unit 102 receives program materials from various sources via satellites, terrestrial microwave transmissions, cable, etc. The program materials are processed by unit 102 to form K individual program data streams in a digital format, where K is an integer. Each program data stream contains program material, which requires a transmission channel having a specified frequency band for its distribution. In order to fully appreciate the invention, the term "transmission channel" used here should not be confused with a "program channel." A "transmission channel" signifies a designated frequency band through which a program data stream containing program material is transmitted. On the other hand, a "program channel" signifies the source of the program material selected by a subscriber to view. For example, a subscriber may select program channel 2 to view program material provided by CBS, program channel 14 to view program material provided by ESPN; program channel 32 to view program material provided by MTV, etc. In this instance, there are K program channels corresponding to the K program data streams.

In accordance with the invention, under control of controller 112, switching unit 104 selects and switches a subset of the K program data streams, say, p program data streams to modulator bank 106, where p≥K. The program data streams in the subset are selected in a manner described below. Each selected program data stream is transmitted through a different transmission channel after it modulates a carrier associated with the transmission channel in a designated forward passband. As is well known, in the United States the designated forward passband for cable TV ranges from 50 MHz to 550 MHz.

Figure 2:
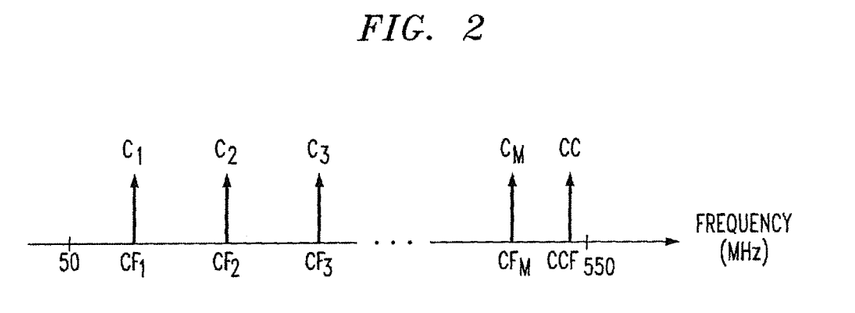
FIG. 2 illustrates selected carriers for transmitting program materials and control messages in a forward passband of the system of FIG. 1.

FIG. 2 illustrates M carriers, $C_1$ through $C_M$, associated with M transmission channels in the forward passband, respectively, which are pre-selected for use in this instance. Since the forward passband is limited in bandwidth, M in this instance represents the maximum number of carriers or transmission channels that the forward passband can accommodate. As shown in FIG. 2, the carrier frequency of $C_1$ is denoted $CF_1$; the carrier frequency of $C_2$ is denoted $CF_2$; . . . ; and the carrier frequency of $C_M$ is denoted $CF_M$. In addition, in accordance with the invention, a control carrier CC having a carrier frequency CCF assigned to carry control messages by controller 112 to the set-top terminals through a control channel in the forward passband.

In prior art, each program channel is fixedly assigned to one of the M carriers for transmission of its program material. In addition, all of the program channels are simultaneously made available to each set-top terminal in a neighborhood. As a result, the number of program channels that a prior art CATV system can provide cannot exceed M. However, the invention overcomes the prior art limitations by dynamically assigning carriers to carry program materials of only those program channels selected by the set-top terminals (or subscribers) in a neighborhood. Advantageously, the number of program channels that the inventive CATV system can provide, although not simultaneously, can exceed M. That is, K can be greater than M in this instance.

Thus, in accordance with the invention, controller 112 communicates to switching unit 104 through link 116, causing unit 104 to switch, to modulator bank 106, the selected p program data streams which contain the program channel materials selected aggregately by the subscribers in the neighborhood. As long as p≤M, which is very likely stemming from the fact that the majority at a given time watch only a few particular favorite program channels, controller 112 manages to assign p carriers to carry the respective data streams. To that end, controller 112 also specifies to unit 104 the selected inputs of modulator bank 106 to which the p data streams are switched.

In this instance, modulator bank 106 includes conventional modulators. Each input to modulator bank 106 is fed to a different modulator for modulating the input onto one of the M carriers. The p data streams are switched by unit 104 to the appropriate inputs of modulator bank 106 to be modulated onto the p assigned carriers, resulting in p data signals representing the modulated carriers, respectively. In addition, controller 112 transmits control messages described below, through link 114, to modulator bank 106 where a modulator modulates the control messages onto the aforementioned control carrier, resulting in a control signal representing the modulated control carrier.

Combiner 108 combines the p data signals and control signal to form a combined signal, which is fed to optical transceiver 110. The latter generates an optical signal representing the combined signal. The optical signal traverses optical fiber 113 to fiber node 122. A transceiver (not shown) in fiber node 122 which performs the inverse function to transceiver 110 converts the optical signal back to the combined signal in electrical form. The combined signal traverses cable distribution network 124 to service area node 126, where the combined signal is multicast to set-top terminals 128-1 through 128-L. A set-top terminal may tune to the control carrier frequency CCF and extract the control signal from the received combined signal. The control signal may contain information identifying the carrier which is assigned to carry the program channel material selected by the set-top terminal. Based on any such information, the set-top terminal tunes to the frequency of the identified carrier and extracts the corresponding data signal from the received combined signal. The selected program channel material is then derived in a well known manner from the extracted data signal for viewing.

Figure 3:
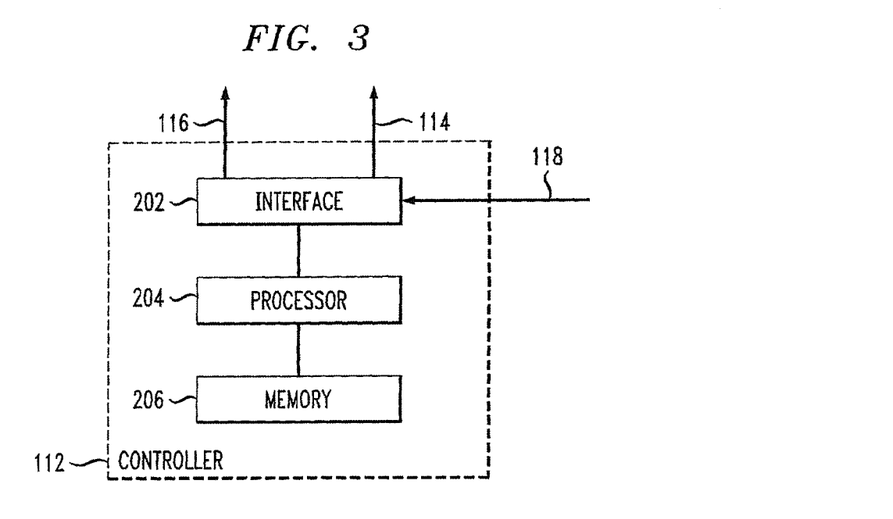
FIG. 3 is a block, diagram of a controller used in the system of FIG. 1.

Referring to FIG. 3, controller 112 includes processor 204 of conventional design, which is connected to memory 206 and interface 202. In accordance with the invention, processor 204 receives, from one or more of set-top terminals 128-1 through 128-L, requests for materials of program channels selected thereby. Such requests are processed by processor 204 in accordance with routines stored in memory 206 which are described below. It suffices to know for now that in response to one such request, processor 204 causes switching unit 104 to switch the program data stream corresponding to the requested program channel to a selected input of modulator bank 106 and assigns an unused carrier for transmitting the data stream if processor 204 has not done so. In addition, processor 204 transmits a control message receivable by the requesting set-top terminal, which includes the information identifying the carrier assigned by processor 204 to carry the requested program channel material. As mentioned before, based on such information, the requesting set-top terminal tunes to the frequency of the identified carrier to obtain the selected program channel material.

Figure 4:
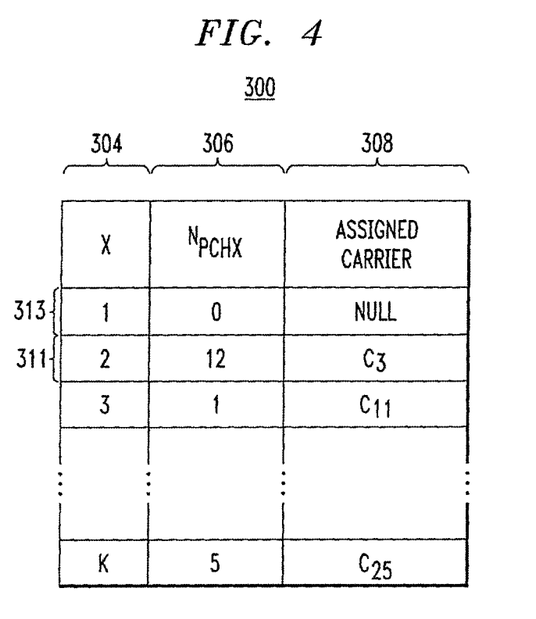
FIG. 4 is a table used by the controller for dynamically assigning the carriers for transmission of program materials in accordance with the invention.

To manage the dynamic assignment of carriers for transmitting requested program channel materials to each neighborhood, an assignment table is used in this instance which is stored in memory 206. FIG. 4 illustrates such an assignment table (denoted 300), which includes columns 304, 306 and 308. Column 304 enumerates each program channel X selectable by a subscriber through a set-top terminal, which ranges from 1 to K in this instance. Column 306 tracks, for each program channel X, the number of subscribers in the neighborhood selected that program channel to watch ($N_{PCHX}$). Column 308 includes entries identifying the carriers assigned by processor 204 to carry the respective materials of program channels X. Thus, with assignment table 300, processor 204 has knowledge that, for example, referring to row 311, carrier $C_3$ (one of the carriers $C_1$ through $C_M$) is assigned for program channel 2 (X=2) which 12 subscribers ($N_{PCHX}$=12) have selected to watch. In addition, as indicated in row 313, no subscriber ($N_{PCHX}$=0) has selected to watch program channel 1 (X=1). Thus, in accordance with the invention, no carrier (Null) is assigned for program channel 1. That is, program channel 1 material is currently not transmitted to service area node 126 and thus not currently made available in the neighborhood.

Figure 5:
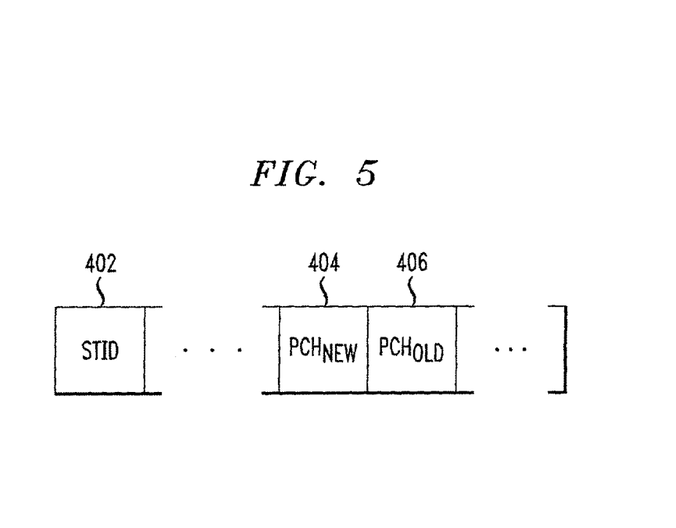
FIG. 5 illustrates a data format of a request processed by the controller.

When a subscriber at a set-top terminal selects a different program channel to watch, a request for material of the newly-selected program channel is sent from the set-top terminal to controller 118. It should be noted at this point that each of set-top terminals 128-1 through 128-L is pre-assigned with an identifier for identifying the set-top terminal. FIG. 5 illustrates the request which includes, among others, STID field 402 containing an identifier identifying the requesting set-top terminal, PCHNEW field 404 containing the newly-selected program channel number, and PCHOLD field 406 containing the previously-selected program channel number. Thus, for example, if the subscriber changes the program channel selection from channel 8 to channel 2 (or in other words "deselects" channel 8 in favor of channel 2), the value of PCHNEW field 404 would be set to "2" and that of PCHOLD field 406 would be set to "8". If the subscriber has just turned on the cable TV to watch program channel 9, the value of PCHNEW field 404 in that instance would be set to "9" and that of PCHOLD field 406 would be set to "0, " indicating an off state. Conversely, if the subscriber who has been watching program channel 9 chooses to turn off the cable TV, the value of PCHNEW field 404 would be set to "0" and that of PCHOLD field 406 would be set to "9."

Referring back to FIG. 1, the above-described request is generated by the requesting set-top terminal, say, terminal 128-1, which incorporates a cable modem for modulating a specified carrier in a reverse passband with the request data. As is well known, in the United States the reverse passband, which ranges from 5 MHz to 42 MHz, is allocated for transmission of signals from set-top terminals to a headend to realize interactive services, e.g., the present inventive cable TV service. The modulated signal from terminal 128-1 representing the request data is fed to service area node 126, from where it is forwarded to fiber node 122 through cable distribution network 124. In fiber node 122, the aforementioned optical transceiver (not shown) generates an optical signal representing the modulated signal. The optical signal traverses optical fiber 115 to optical transceiver 110 in headend 100. Optical transceiver 110 converts the optical signal back to the modulated signal in electrical form. The modulated signal is then demodulated by demodulator 130 to recover the original request, which is fed to controller 112 through link 118. In response to the received request, controller 112 invokes a first routine stored in memory 206.

Figure 6:
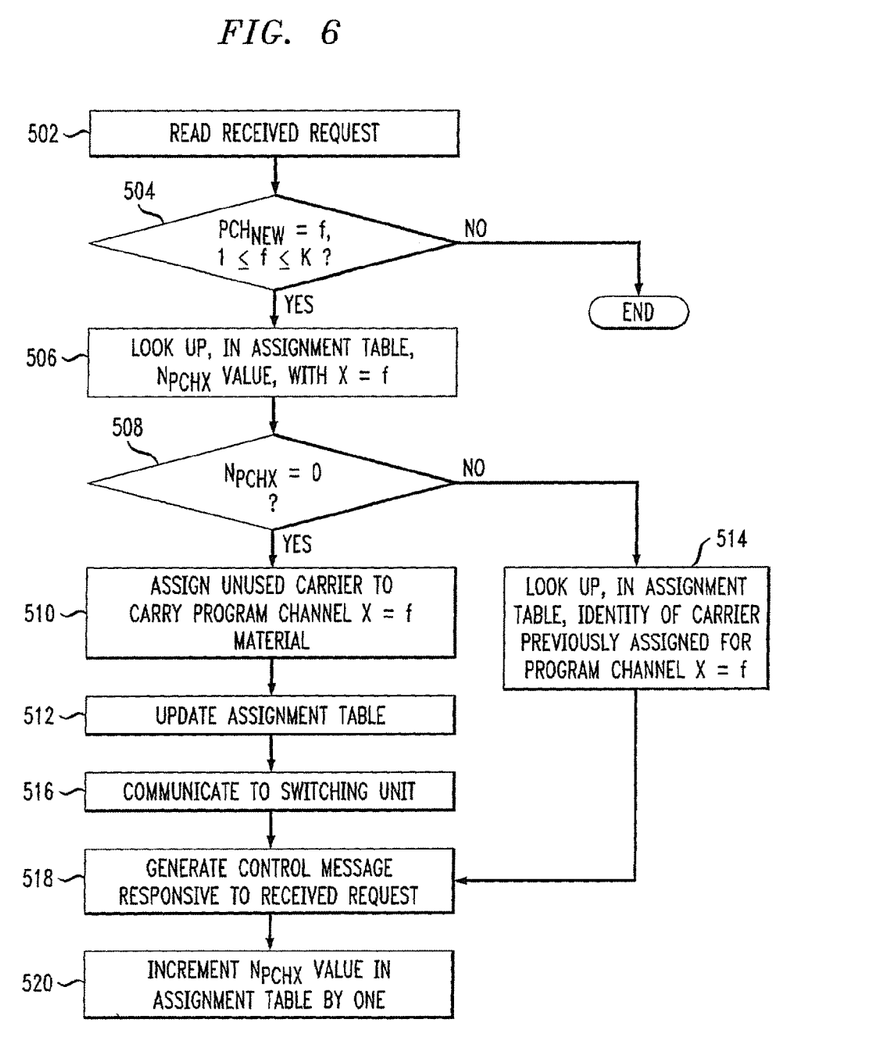
FIG. 6 is a flow chart illustrating a process for processing the request.

Instructed by the first routine, processor 204 reads the received request, as indicated at step 502 in FIG. 6. At step 504, processor 204 determines whether PCHNEW field 404 in the request has a nonzero value f, 1>f>K. If not, i.e., the PCHNEW field value equal to "0" indicating that the subscriber's cable TV has been turned off, the routine comes to an end. Otherwise, processor 204 at step 506 looks up, in assignment table 300, the value of $N_{PCHX}$ with X=f in this case. At step 508, processor 204 determines whether the $N_{PCHX}$ value just looked up equals 0. If $N_{PCHX}$=0, analogous to the previously described situation with respect to row 313 of table 300, no carrier has been assigned to carry the requested program channel material to service area node 126. That is, the requested program material is currently not made available to the neighborhood. In that case, processor 204 at step 510 assigns an unused carrier to carry the requested material of program channel X=f. The new carrier may be selected to avoid as much as possible noise and interference with other carriers being used to optimize the cable TV quality. At step 512, processor 204 updates assignment table 300 to include the identity of the carrier assigned for program channel X=f. Processor 204 at step 516 communicates to switching unit 104, directing it to switch the program data stream associated with program channel X=f to the proper input of modulator bank 106 such that the program channel material is modulated onto the newly-assigned carrier. At step 518, processor 204 generates a control message responsive to the received request, which is to be read by the requesting set-top terminal, terminal 128-1 in this instance. The control message includes, among other information, the STID from the request identifying terminal 128-1 which is the intended recipient of the message, and the identity of the assigned carrier carrying the requested program channel material. The control message is transmitted through the control channel in a manner described before and multicast from service area node 126 to the set-top terminals in the neighborhood. In particular, terminal 128-1 is tuned to the control channel and reads the STID information in the control message, which identifies terminal 128-1 in this instance. Recognizing that it is the intended recipient of the message, terminal 128-1 goes on to read other information in the message including the identity of the assigned carrier carrying its selected program channel material. With the knowledge of the assigned carrier's identity, terminal 128-1 tunes to the frequency of the assigned carrier to receive the selected program channel material.

In any event, the routine proceeds from step 518 to step 520 where processor 204 increments the value of $N_{PCHX}$ with X=f in assignment table 300 by one, reflecting the fact that an additional subscriber (or set-top terminal) in the neighborhood has selected program channel X=f to view. Referring back to step 508, if processor 204 determines that the value of $N_{PCHX}$ with X=f does not equal 0, i.e., at least one set top terminal currently receiving program channel X material carried by a previously assigned carrier, the routine proceeds to step 514. Processor 204 at step 514 looks up, in assignment table 300, the identity of the carrier previously assigned for program channel X=f. The routine then proceeds to step 518 described before.

Figure 7:
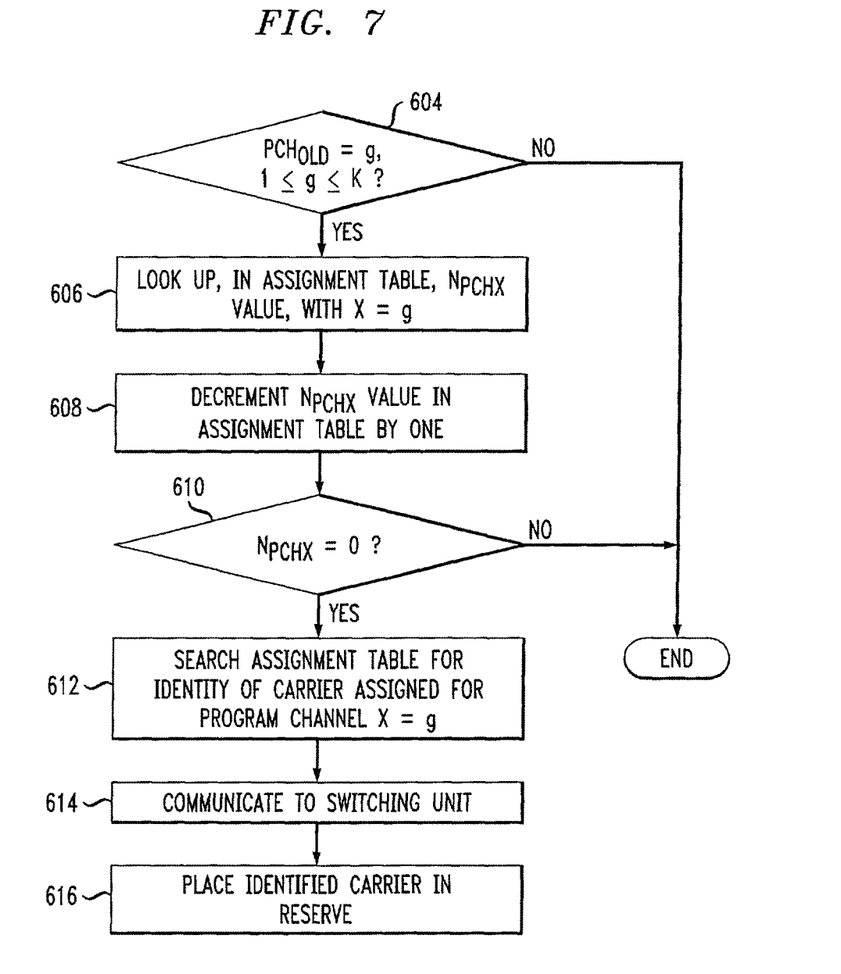
FIG. 7 is a flow chart illustrating a process for retiring an unused carrier.

After the first routine is completed, a second routine is invoked to perform a garbage collection function for retiring any carrier carrying program material which is no longer selected by any set-top terminal in the neighborhood. Instructed by this second routine, processor 204 at step 604 determines whether PCHOLD field 406 in the received request has a nonzero value g, 1>g>K. If not, i.e., the PCHOLD field value equal to "0" indicating that the subscriber's cable TV has just been turned on, the second routine comes to an end. Otherwise, processor 204 at step 606 looks up, in assignment table 300, the value of $N_{PCHX}$ with X=g in this case. At step 608, processor 204 decrements the $N_{PCHX}$ value just looked up by one, reflecting the fact that one fewer subscriber (or set-top terminal) in the neighborhood selected program channel X=g to view. Processor 204 at step 610 determines whether the resulting $N_{PCHX}$ value equals 0. If not, the second routine comes to an end. Otherwise, if $N_{PCHX}$=0, i.e., program channel X=g no longer selected by any subscriber (or set-top terminal) in the neighborhood, the second routine proceeds to step 612. Processor 204 at step 612 searches assignment table 300 for the identity of the carrier assigned for program channel X=g. Processor 204 at step 614 communicates to switching unit 104, causing unit 104 to stop switching the program data stream corresponding to program channel X=g to modulator bank 106, thereby terminating the transmission of the program data stream otherwise carried by the identified carrier. Processor 204 at step 616 places the identified carrier in reserve by substituting the carrier identity entry with "Null" in assignment table 300.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, system 10 is illustratively used to serve a single neighborhood. However, in another embodiment of the invention, system 10 is similarly used to serve multiple neighborhoods.

In addition, based on the disclosure heretofore, it is apparent that system 10 can readily accommodate what is known in the art as a picture-in-picture (PIP) feature providing simultaneous viewing of multiple program channels. In that case, a set-top terminal supporting the PIP feature requests materials of multiple program channels and simultaneously tunes to the assigned carriers carrying the requested program materials.

Further, in the event that the carriers in CATV system 10 are oversubscribed, i.e., no available carrier can be assigned by controller 112 to carry new program material requested by a set-top terminal in the neighborhood, "blocking" may be implemented such that the requesting set-top terminal is temporarily denied access to the new program material. However, the requesting set-top terminal may be instructed by controller 112 to tune in the meantime to a pre-set channel reserved for the blocking purposes. For example, this pre-set channel may carry commercials, infomercials, coming movie attractions, etc., in addition to a stand-by notice informing the subscriber of the unavailability of the requested program material. Alternatively, controller 112 may transmit a text message including the stand-by notice to the requesting set-top terminal to be shown to the subscriber. In either event, as soon as a carrier becomes available, controller 112 transmits another notice to the requesting set-top terminal to inform the subscriber of the availability of the requested program material, followed by a control message identifying the carrier newly assigned to carry such material. In response to this control message, the set-top terminal tunes to the frequency of the identified carrier to obtain the requested program material.

Moreover, the request of FIG. 5 may automatically be generated by a set-top terminal to deselect a program channel as soon as an event on the program channel such as a movie is over. For example, by setting a time-out clock in the headend or set top terminal to track the play time of the event, the request, with PCHNEW=0, is transmitted as soon as the time-out period corresponding to the length of the event or a fixed time expires. If no other set-top terminals in the same neighborhood tune to the frequency of the carrier assigned for the program channel, the assigned carrier will be retired in accordance with the invention. Thus, at an event boundary, a program channel may be deselected based on a fixed or variable time-out period.

The request for deselecting a program channel may also be automatically generated by a set-top terminal in response to a lack of an audience. For example, the set-top terminal may incorporate detection technologies such as motion detectors, acoustic sensors and/or infrared sensors, which are used to detect presence of any viewers in front of the set-top terminal by their movement, voice and/or body heat. If it is determined that no viewer is present, the request for deselecting the program channel is automatically generated by the set-top terminal.

Finally, system 10 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Thus, for example, switching unit 104 and modulator bank 106 in system 10 may be realized by one or more DSPs. A DSP typically comprises a combination of digital logic devices and other components, which may be a state machine or implemented with a dedicated microprocessor or micro-controller running a software program or having functions programmed in firmware.

What is claimed is:

1. A system configured to transmit a plurality of content streams comprising one or more content elements selected by individual ones of a group of terminals, said system comprising:
    a control apparatus configured to associate one or more carriers with respective ones of said one or more content elements, said control apparatus comprising at least one data interface, a data processing apparatus, and a memory apparatus, and one or more computerized logic routines operative to run on said data processing apparatus;
    a modulator apparatus in data communication with the control apparatus; and
    a switching apparatus in data communication with the control apparatus configured to route a plurality of data streams to said modulator apparatus, each of said plurality of data streams configured to respectively represent individual ones of said one or more content elements selected by said individual ones of said group of terminals;
    wherein said control apparatus is further configured to cause individual ones of said group of terminals to tune to a previously determined channel configured to carry one or more advertisements when said one or more carriers cannot carry said one or more content elements selected by individual ones of said group of terminals;
    wherein said modulator apparatus is further configured to modulate said one or more carriers with said plurality of data streams configured to represent said individual ones of said one or more content elements associated therewith to generate said plurality of content streams;
    wherein individual ones of said plurality of data streams are automatically removed from modulation on said one or more carriers when a program boundary of said individual ones of said plurality of content elements is reached; and
    wherein said control apparatus is further configured to:
        determine whether said selected one or more content elements is included in said plurality of content streams currently being provided to said individual ones of said group of terminals; and
        in response to a determination that said selected one or more content elements is already included in said plurality of content streams, send a control message to a terminal of said individual ones of said group of terminals, said control message comprising an identification field which includes an identification associated with said terminal of said individual ones of said group of terminals, and an indication of respective ones of said one or more carriers associated with said selected one or more content elements.

2. The system of claim 1, wherein at least one of said individual ones of said group of terminals comprises a set-top terminal.

3. The system of claim 1, further comprising an interface configured to receive one or more requests for specific ones of said one or more content elements from said individual ones of said group of terminals.

4. The system of claim 1, further comprising an interface configured to send, to a particular terminal of said group of terminals, a control message comprising information configured to identify at least one carrier associated with a specific one of said one or more content elements selected by said particular terminal of said group of terminals.

5. The system of claim 4, wherein said control message is sent via a control channel.

6. The system of claim 1, wherein each of said one or more content elements is associated with a respective one of a plurality of program channels selectable by each terminal in said group of terminals.

7. The system of claim 1, wherein each terminal in said group of terminals is connected to a node.

8. A method for providing one or more program materials to a group of terminals, said method comprising:
    assigning a respective carrier to carry each of a plurality of programs to all of said group of terminals;
    processing a request for a selected program received from an individual one of said group of terminals;
    determining one of said respective carriers to which said selected program is assigned; and
    in response to said determining, sending a control message to said individual one of said group of terminals, said control message comprising an identification field which includes an identification associated with said individual one of said group of terminals, and an indication of said one respective carrier associated with said selected program so as to enable said individual one of said group of terminals to tune to said one respective carrier and receive said selected program.

9. The method of claim 8, wherein each terminal in said group of terminals is connected to a common node.

10. The method of claim 8, wherein said control message is sent via a dedicated control channel.

11. The method of claim 8, further comprising:
    in response to said determining that said selected program is not among said plurality of programs assigned to said respective carrier, assigning at least one particular carrier to carry said selected program.

12. The method of claim 8, further comprising modulating said assigned carriers so as to carry respective ones of said plurality of programs.

13. The method of claim 8, further comprising multicasting said plurality of programs to said group of terminals.

14. The method of claim 8, further comprising:
    identifying when at least one carrier from among said assigned carriers is assigned to carry one or more programs which are no longer being viewed by any terminal in said group of terminals; and
    retiring said identified at least one carrier, said retiring enabling reassignment of said at least one carrier.

15. The method of claim 8, wherein each of said plurality of programs is associated with a respective one of a plurality of program channels selectable by said group of terminals.

16. A method for transmission of a plurality of content streams comprising one or more content elements selected by individual ones of a group of terminals, said method comprising:
   associating one or more carriers with respective ones of said one or more content elements;
   receiving from a particular one of said group of terminals one or more requests for a particular one of said selected one or more content elements;
   determining whether said particular one of said selected one or more content elements is already included in said respective ones of said one or more content elements;
   in response to determining that said selected one or more content elements is already included in said respective ones of said one or more content elements, sending, to said particular one of said group of terminals, a control message comprising information identifying at least one carrier associated with said particular one of said selected one or more content elements selected by said particular one of said group of terminals;
   routing a plurality of data streams to a modulator apparatus, each of said plurality of data streams respectively representing individual ones of said one or more content elements;
   causing said modulator apparatus to modulate said one or more carriers with said plurality of data streams representing said individual ones of said one or more content elements associated therewith to generate said plurality of content streams; and
   automatically removing individual ones of said selected one or more content elements from modulation on said one or more carriers, said removal based at least in part on a predetermined length of time allotted for each of said individual ones of said selected one or more content elements to be carried thereon.

17. The method of claim 16, wherein said control message is sent through a control channel.

18. The method of claim 16, wherein said control message includes information identifying said particular one of said group of terminals.

19. The method of claim 16, wherein each of said one or more content elements is associated with a respective one of a plurality of program channels selectable by said group of terminals.

20. The method of claim 16, wherein said plurality of content streams comprise cable television signals.

21. An apparatus configured to provide a plurality of content elements to a plurality of terminals via a network, said apparatus comprising:
   an interface configured to communicate with said plurality of terminals via said network; and
   a processor in data communication with said interface and configured to execute at least one computer program thereon, said computer program comprising a plurality of instructions which are configured to, when executed:
      assign a plurality of carriers to carry said plurality of content elements to each terminal of said plurality of terminals;
      process a request for a selected content element received from an individual one of said terminals of said plurality;
      determine whether at least one of said plurality of carriers is already carrying said selected content element;
      in response to a determination that said at least one of said plurality of carriers is already carrying said selected content element, send a control message to said individual one of said terminals of said plurality of terminals, said control message comprising an identification field which includes an identification associated with said individual one of said terminals of said plurality of terminals, and an indication of said at least one of said plurality of carriers associated with said selected content element so as to enable said at least said individual one of said terminals to tune to said at least one of said plurality of carriers and receive said selected content element;
      in response to a determination that said at least one of said plurality of carriers is not already carrying said selected content element, determine whether any of said plurality of carriers is available to carry said selected content element; and
      based at least on said determination of whether any of said plurality of carriers is available to carry said selected content element, perform one of:
         (i) when said plurality of carriers can carry said selected content element, cause said interface to communicate information to at least said individual one of said plurality of terminals, said information configured to identify at least one particular carrier from among said plurality of carriers assigned to carry said selected content element; and
         thereafter, automatically remove said selected content element from said at least one particular carrier after a predetermined length of time allotted for said selected content element to be carried thereon; or
         (ii) when none of said plurality of carriers can carry said selected content element, cause said individual one of said plurality of terminals to tune to an unrequested channel for at least a period of time.

22. The apparatus of claim 21, wherein said a plurality of instructions are further configured to, when executed:
   subsequent to said determination that none of said plurality of carriers can carry said selected content element, determine that one or more of said plurality of carriers can carry the selected content element; and
   notify at least said individual one of said plurality of terminals as to an identification of said one or more carriers so as to enable said at least said individual one of said terminals to tune to said one or more carriers and receive said selected content element.

23. The apparatus of claim 22, wherein said unrequested channel comprises content other than the selected content element, the other content comprising information content which a user of the individual one of the plurality of terminals can view until said notification occurs.

24. The apparatus of claim 22, wherein said a plurality of instructions are further configured to, when executed, cause transmission via the interface and the network of a notice indicative of availability for the selected content element, the notice configured to be shown to a user of the individual one of the plurality of terminals, the transmission of the notice occurring after said determination that one or more of said plurality of carriers can carry the selected content element.

25. The apparatus of claim 21, wherein said plurality of instructions are further configured to, when executed:
- determine that said selected content element is not among said plurality of content elements assigned to said at least one particular carrier from among said plurality of carriers; and
- based at least in part on said determination, assign said at least one particular carrier from among said plurality of carriers to carry said selected content element.

26. The apparatus claim 21, wherein said plurality of content elements are multicast to each terminal in said plurality of terminals.

27. The apparatus of claim 21, said plurality of instructions are further configured to, when executed:
- identify when said at least one particular carrier from among said plurality of carriers is assigned to carry one or more content elements which are no longer being viewed by any terminal in said group of terminals; and
- retire said identified at least one particular carrier, so as to make it available for reassignment.

28. The apparatus of claim 21, wherein each of said plurality of content elements is associated with a respective one of a plurality of program channels selectable by each terminal in said group of terminals.

29. The apparatus of claim 21, wherein said control message is sent via a dedicated control channel.

\* \* \* \* \*